United States Patent
Rouvellou

(10) Patent No.: US 6,934,559 B2
(45) Date of Patent: Aug. 23, 2005

(54) METHOD OF AND A SYSTEM FOR ESTIMATING THE FREQUENCY UNCERTAINTY OF A MOBILE RADIO SYSTEM ABLE TO USE TWO DIFFERENT MOBILE RADIO NETWORKS

(75) Inventor: Laurent Rouvellou, Paris (FR)

(73) Assignee: Alcatel, Paris (FR)

( * ) Notice: Subject to any disclaimer, the term of this patent is extended or adjusted under 35 U.S.C. 154(b) by 387 days.

(21) Appl. No.: 10/178,517

(22) Filed: Jun. 25, 2002

(65) Prior Publication Data

US 2003/0008621 A1 Jan. 9, 2003

(30) Foreign Application Priority Data

Jun. 28, 2001 (FR) .......................................... 01 08536

(51) Int. Cl.⁷ .............................................. H04M 1/00
(52) U.S. Cl. ................. 455/552.1; 455/553.1; 455/550.1; 455/76; 455/502; 455/436; 375/219; 375/354; 375/356; 370/503
(58) Field of Search ......................... 455/552.1, 553.1, 455/550.1, 76, 502, 436; 375/219, 354, 356; 370/503

(56) References Cited

U.S. PATENT DOCUMENTS

| | | | | |
|---|---|---|---|---|
| 3,872,455 A | * | 3/1975 | Fuller et al. ........... 340/870.05 |
| 6,066,964 A | * | 5/2000 | Meneghini ................... 326/93 |
| 6,311,081 B1 | * | 10/2001 | Northcutt et al. .......... 455/574 |
| 6,549,064 B2 | * | 4/2003 | Bandy et al. ............... 327/536 |
| 2001/0011914 A1 | * | 8/2001 | Pornet ........................ 327/165 |
| 2002/0155862 A1 | * | 10/2002 | Ormson ....................... 455/561 |

FOREIGN PATENT DOCUMENTS

WO      WO 0129980 A1    4/2001

* cited by examiner

*Primary Examiner*—Vivian Chin
*Assistant Examiner*—Minh D. Dao
(74) *Attorney, Agent, or Firm*—Sughrue Mion, PLLC

(57) ABSTRACT

In a method of estimating the relative frequency uncertainty between two parts of a mobile radio system able to communicate via two mobile radio networks at first and second particular frequencies, each part of the mobile radio system has a clock from which the particular frequency is derived and the uncertainty is estimated by measuring the number of pulses of each of the clocks during a time window of duration T starting at a time t. The method includes the following steps, with the time window T sliding:

a) measuring the number of pulses of each of the clocks at n intermediate times $t+(T/n), t+(2T/n), \ldots, t+(nT/n)$, where n is a positive integer, b) storing the numbers of clock pulses thereby obtained in memory, c) calculating the relative frequency uncertainty at time $t+T$ from the numbers of clock pulses stored in memory.

10 Claims, 2 Drawing Sheets

METHOD OF AND A SYSTEM FOR ESTIMATING THE FREQUENCY UNCERTAINTY OF A MOBILE RADIO SYSTEM ABLE TO USE TWO DIFFERENT MOBILE RADIO NETWORKS

CROSS-REFERENCE TO RELATED APPLICATIONS

This application is based on French Patent Application No. 01 08 536 filed Jun. 28, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of estimating the relative frequency uncertainty between a part of a mobile radio system able to use a first mobile radio network at a first particular frequency and another part of the same mobile radio system able to use a second mobile radio network at a second particular frequency.

2. Description of the Prior Art

The field of the invention is that of mobile radio.

At present, most mobile radio calls are transmitted over a single network, such as the GSM network. New generations of networks are now appearing, for example the UMTS network, which coexist with previous networks, if only during a transition period.

It is necessary to be able to communicate in two different transmission modes, i.e. over two different networks, using the same mobile radio system, for example the same mobile telephone. The GSM and UMTS networks are used as examples hereinafter, but the invention applies equally well to other networks.

A mobile radio network includes base stations which send to and receive from mobile telephones in their coverage area in a particular frequency band.

Communicating via two different networks consists in being able to communicate interchangeably via the GSM network or the UMTS network as a function in particular of the GSM or UMTS base station in whose coverage area the mobile telephone is located and in being able to start a call via the GSM network and continue it via the UMTS network, for example because the mobile has moved from the coverage area of a GSM base station to that of a UMTS base station.

For this to be possible the mobile telephone must be synchronized to the GSM network and to the UMTS network at all times. Synchronization includes time synchronization, which entails knowing the time on the GSM network and the time on the UMTS network, and frequency synchronization.

The remainder of the description concerns frequency synchronization.

Base stations and mobile telephones include a quartz crystal clock from which particular communication frequencies are derived.

Frequency synchronization entails knowing the relative uncertainty of the different clock frequencies used in a call, caused by drift affecting the clocks.

FIG. 1 shows diagrammatically a mobile radio system with two networks. It includes a GSM base station 1, a UMTS base station 2 and a mobile telephone 3 having a GSM part 31 and a UMTS part 32.

Four frequencies are used in a call using the GSM network and the UMTS network: the frequency $f_{GSMBase}$ of the GSM base station 1, the frequency $f_{UMTSBase}$ of the UMTS base station 2, the frequency $f_{GSMMobile}$ of the GSM part 31 of the mobile, and the frequency $f_{UMTSMobile}$ of the UMTS part 32 of the mobile.

Some uncertainty as to these frequencies is tolerated, enabling a required quality of service to be maintained:

with regard to the base station frequencies, GSM recommendation 05.10 V6.3.0 paragraph 5.10 specifies that the relative difference $d_{GSM}$ between the nominal GSM frequency and the frequency $f_{GSMBase}$ must not exceed 0.05 ppm (parts per million), and likewise the relative difference $d_{UMTS}$ between the nominal UMTS frequency and the frequency $f_{UMTSBase}$:

$$|d_{GSM}|<0.5 \text{ ppm and } |d_{UMTS}|<0.5 \text{ ppm}$$

As a result of this, the uncertainty or tolerance ΔBase associated with the frequencies of the GSM base station 1 and the UMTS base station 2 must not exceed 0.1 ppm:

$$|\Delta\text{Base}|<0.1 \text{ ppm, where}$$

$$\Delta Base = \frac{f_{GSMBase} - f_{GSMnom}}{f_{GSMnom}} + \frac{f_{UMTSnom} - f_{UMTSBase}}{f_{UMTSnom}}$$

also, if a call is set up between the UMTS base station 2 and the mobile 3, in this instance the UMTS part 32 of the mobile, the relative uncertainty ΔUMTS between the frequency $f_{UMTSBase}$ and the frequency $f_{UMTSMobile}$ can be measured, and is expressed by the following equation:

$$\Delta UMTS = \frac{f_{UMTSBase} - f_{UMTSMobile}}{f_{UMTSnom}}$$

no call being set up between the GSM base station 1 and the mobile 3, in this instance the GSM part 31 of the mobile, the relative uncertainty ΔGSM corresponding to the frequencies $f_{GSMBase}$ and $f_{GSMMobile}$ is not known a priori, and is expressed by the following equation:

$$\Delta GSM = \frac{f_{GSMMobile} - f_{GSMBase}}{f_{GSMnom}}$$

likewise, if ΔMobile designates the relative uncertainty associated with the frequencies $f_{UMTSMobile}$ and $f_{GSMMobile}$, ΔMobile is expressed by the following equation:

$$\Delta Mobile = \frac{f_{UMTSMobile} - f_{UMTSnom}}{f_{UMTSnom}} - \frac{f_{GSMnom} - f_{GSMMobile}}{f_{GSMnom}}$$

Also: ΔBase+ΔUMTS+ΔMobile+ΔGSM =0

The problem is to estimate the uncertainty ΔGSM in order to be ready to communicate over the GSM network from the very start of the call.

A solution that measures the uncertainty ΔGSM by setting up a GSM call is time-consuming and interferes with other calls until the uncertainty ΔGSM has been measured.

ΔBase being limited, and ΔUMTS being known, the object of the present invention is to calculate ΔMobile to determine ΔGSM.

The frequencies $f_{UMTSMobile}$ and $f_{GSMMobile}$ are respectively derived from the clock of the UMTS part 32 and the clock of the GSM part 31, whose signals are shown in FIG. 2. As a result of this, any frequency offset that may exist between the two mobile telephone clocks causes a shift between the frequencies of the mobile corresponding to the uncertainty ΔMobile.

This shift is conventionally calculated by the counters method, i.e. by counting the number $N_{UMTS}$ of clock pulses of the part 31 and the number $N_{GSM}$ of clock pulses of the part 32 from a time t during a particular time window of duration T. The duration T required for the numbers $N_{UMTS}$ and $N_{GSM}$ to be sufficiently accurate is generally of the order of 1 second. According to some calculations, T=1.04 s.

If neither the frequency of the clock of the GSM part 31 nor the frequency of the clock of the UMTS part 32 is subject to any shift, and these frequencies are therefore respectively equal to 13 MHz and 19.2 MHz, the ratio $N_{UMTS}/N_{GSM}$ is constant; to be more precise:

$$\frac{N_{UMTS}}{N_{GSM}} = \frac{f_{UMTSMobile}}{f_{GSMMobile}}$$

If a shift occurs at one of the clocks, and therefore in the corresponding frequency then:

$$\frac{N_{UMTS}}{N_{GSM}} = \frac{f_{UMTSMobile}}{f_{GSMMobile}} + \Delta$$

The term Δ linked to the existing frequency shift between the two clocks of the mobile telephone is the required ΔMobile. It can be obtained by the counters method just described.

However, the period of 1.04 s over which the numbers $N_{UMTS}$ and $N_{GSM}$ of pulses are measured is very long on the scale of a mobile radio call.

Also, the current availability of the measured value of ΔMobile every 1.04 s is insufficient.

This is because ΔMobile varies during the measurement process, in particular as a function of temperature, humidity, supply voltage, surrounding electronics, etc: it is therefore useful to determine ΔMobile more frequently than every 1.04 s, i.e. at intermediate times, for example every 0.5 s, as in the GSM network.

The object of the invention is to propose a method of estimating frequency uncertainty that improves the availability of the uncertainty measurement by simultaneously measuring the GSM and UMTS counters at intermediate times that are much more closely spaced and storing the results obtained in memory.

Also, the accuracy of the measured value ΔMobile is insufficient.

In the final analysis, the result of the measurement is no more than an average over the period T, whereas what is required is a result at a given time t.

This problem is illustrated by an example shown in FIG. 3.

The measurement starts at a time $t_{DM}$ and ends at time $t_{FM}$, i.e. 1.04 s later. An uncertainty ΔMobile (or ΔM) with linear variation is taken by way of example, but this does not always apply. The uncertainty $\Delta M_M$ measured by the counters method is not the required uncertainty ΔM1 but the average uncertainty, i.e. ΔM0+(ΔM1−ΔM0)/2.

The object of the invention is to propose a frequency uncertainty estimation method that improves the accuracy with which ΔMobile is measured from the evolution of ΔMobile.

SUMMARY OF THE INVENTION

The invention provides a method of estimating the relative frequency uncertainty between a part of a mobile radio system able to communicate via a first mobile radio network at a first particular frequency and another part of the same mobile radio system able to communicate via a second mobile radio network at a second particular frequency, in which method each part of the mobile radio system has a clock from which the particular frequency is derived and the uncertainty is estimated by measuring the number of pulses of each of the clocks during a time window of duration T starting at a time t, and which method includes the following steps:

a) measuring the number of pulses of each of the clocks at n intermediate times t+(T/n), t+(2T/n), . . . , t+(nT/n), where n is a positive integer, b) storing the numbers of clock pulses thereby obtained in memory, c) calculating the relative frequency uncertainty at time t+T from the numbers of clock pulses stored in memory, and d) iterating steps a) and b) at times t', where the difference between two consecutive times t' is less than T, and with the time window of duration T sliding to obtain the uncertainty at any time t'.

According to one feature of the invention the difference between two consecutive times t' is of the order of T/n.

The duration of measuring the numbers of pulses at the intermediate times is preferably of the order of T/n.

According to another feature of the invention the duration T of the time window induces a relative frequency uncertainty error and the step c) further includes the following steps:

estimating the evolution of the uncertainty over the time window T from the numbers of clock pulses measured at the intermediate times and stored in memory, calculating the uncertainty error from the evolution, and correcting the uncertainty as a function of the error.

T can be of the order of 1 second.

The measurements of the numbers of clock pulses obtained are advantageously completed by interpolation.

The invention also provides a mobile radio system having a first part able to communicate via a first mobile radio network at a first particular frequency and a second part able to communicate via a second mobile radio network at a second particular frequency, in which system each part has a clock from which the particular frequency is derived and which system further includes a system for measuring the number of pulses of each of the clocks and a program memory containing a program for implementing a method defined above.

The invention further provides a mobile radio system having a first part able to communicate via a first mobile radio network at a first particular frequency and a second part able to communicate via a second mobile radio network at a second particular frequency, in which system each part has a clock from which the particular frequency is derived and which system further includes a system for measuring the number of pulses of each of the clocks during a time window of duration T starting at a time t, a calculator unit, and a memory for storing the numbers of clock pulses measured at intermediate times t+(T/n), t+(2T/n), . . . , t+(nT/n).

In one embodiment of the invention the memory is a FIFO memory.

The system advantageously further includes a unit for estimating the error resulting from the duration T of the time window.

DETAILED DESCRIPTION OF THE PREFERRED EMBODIMENT

A mobile telephone is considered hereinafter by way of an example of a mobile radio system.

Figure 1:
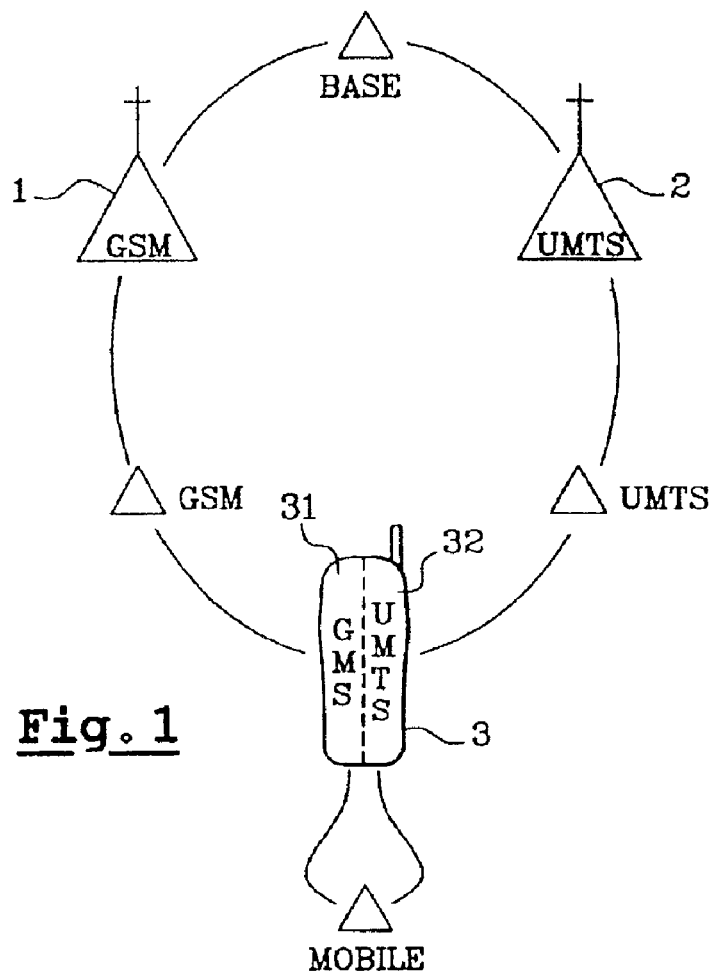
FIG. 1, already described, shows diagrammatically a mobile radio system with two networks.
Figure 2:
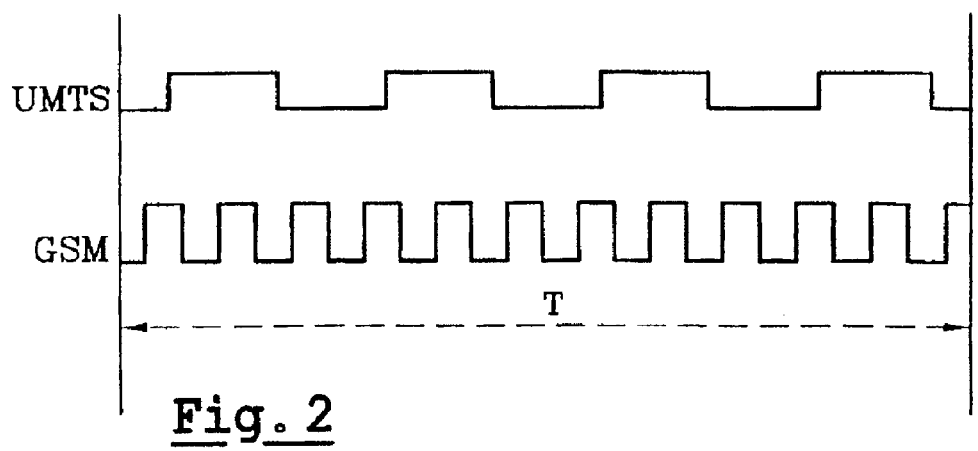
FIG. 2, already described, shows diagrammatically clock signals of two parts of a mobile radio system able to communicate via two mobile radio networks.
Figure 3:
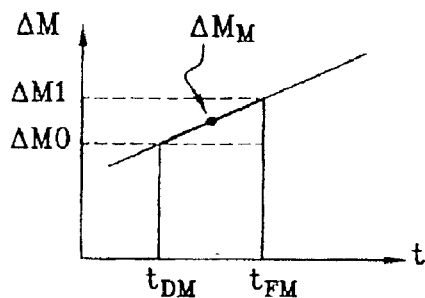
FIG. 3, already described, shows diagrammatically the inaccuracy of the measured value of ΔMobile in the case of a linear uncertainty ΔMobile.
Figure 4:
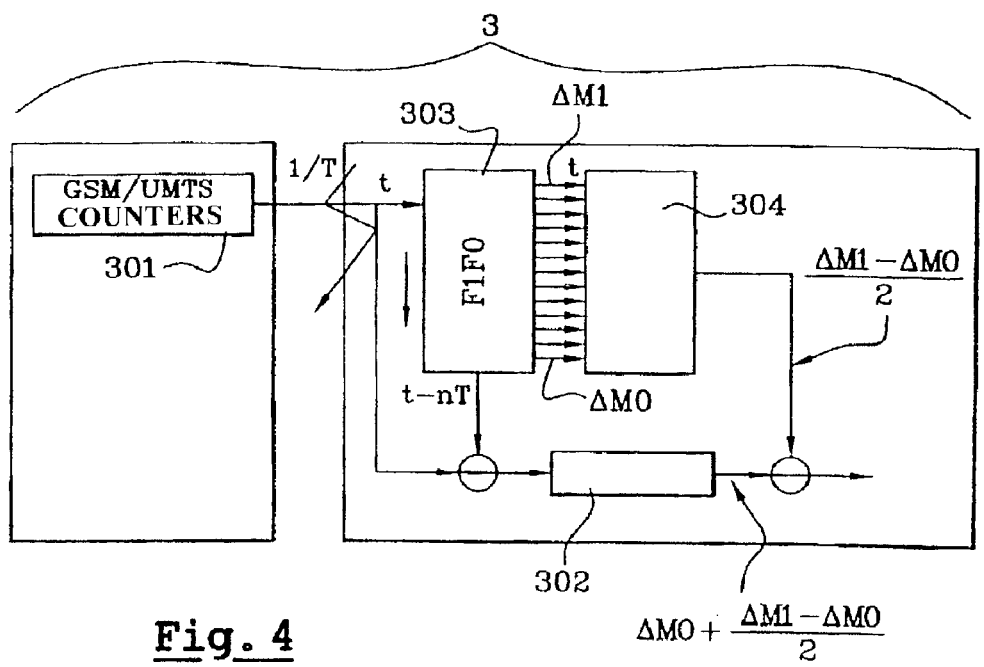
FIG. 4 shows diagrammatically the components introduced into the mobile radio system to improve the availability and the precision of the value of ΔMobile as measured in accordance with the invention.

As shown in FIG. 4, the numbers $N_{UMTS}$ and $N_{GSM}$ are obtained conventionally by means of a GSM and UMTS counter 301 and a unit 302 for calculating uncertainty by the counters method previously described: the value $\Delta M0 + (\Delta M1 - \Delta M0)/2$ is obtained at the output of the unit 302.

The invention also counts clock pulses at n intermediate times, where n is a positive integer, that is to say at $t+(T/n)$, $t+(2T/n), \ldots, t+(nT/n)$. Each of these numbers of pulses $N_{UMTS1}, N_{UMTS2}, \ldots N_{UMTSn}$ and $N_{GSM1}, N_{GSM2}, \ldots, N_{GSMn}$ is measured during a duration d. The duration d can be equal to T/n, but can vary from one intermediate time to another.

The numbers of pulses obtained at each intermediate time are stored in a memory 303 which can be a first in first out (FIFO) stack integrated into the mobile telephone 3: the numbers of pulses $N_{UMTS1}$ and $N_{GSM1}$, measured at the start of measurement time $t_{DM}$ and thus corresponding to $\Delta M0$ are at the bottom of the stack 303, the numbers $N_{UMTS2}$ and $N_{GSM2}$ measured at time $t_{DM}+(T/n)$ correspond to the next element of the stack, and so on, the numbers of pulses $N_{UMTSn}$ and $N_{GSMn}$ measured at the end of measurement time $t_{FM}$ and therefore corresponding to $\Delta M1$ being at the top of the stack 303.

The evolution of ΔMobile can be determined from the measurements effected at these intermediate times; although each of the measurements effected during a time T/n is less accurate than that effected during a time T by the counters method previously described, the accuracy obtained is more than sufficient to determine the evolution of ΔMobile.

The error induced during the period T can be estimated by any method known to the person skilled in the art, for example by calculating the average drift over time of the curve obtained from all of the measurements stored in the memory 303, using an error estimator unit 304. The following value is obtained at the output of the unit 304: $(\Delta M1 - \Delta M0)/2$.

By adding the value $\Delta M0 + (\Delta M1 - \Delta M0)/2$ obtained at the output of the unit 302 to the value $(\Delta M1 - \Delta M0)/2$ obtained at the output of the unit 304, ΔM1 is obtained, i.e. a more accurate measurement.

What is more, knowing the evolution of the measured values enables estimation by interpolation of measured values between the measurements effected at times $t+(T/n), \ldots, t+T$, for example if a mobile radio call is received between those times. This increases the availability of measurements, since measurements are then available continuously.

The values of measurements carried out beyond the measurements actually effected, i.e. at times after the end of measurement time, can be predicted in the same fashion.

The preceding measurements are effected during a time window T.

To improve the availability of the measurement, the preceding measurements and calculations are iterated with the time window T sliding and with an interval corresponding to the required measurement frequency, for example an interval equal to T/n.

The method according to the invention can be implemented in hardware, by integrating the units 303 and 304 into the mobile telephone 3, or in software. The mobile telephone conventionally includes a program memory containing the operating software of the mobile telephone; it is then sufficient to include in that software a subroutine for implementing the method according to the invention.

What is claimed is:

1. A method of estimating the relative frequency uncertainty between a part of a mobile radio system able to communicate via a first mobile radio network at a first particular frequency and another part of the same mobile radio system able to communicate via a second mobile radio network at a second particular frequency, in which method each part of said mobile radio system has a clock from which said particular frequency is derived and said uncertainty is estimated by measuring the number of pulses of each of said clocks during a time window of duration T starting at a time t, and which method includes the following steps:

a) measuring the number of pulses of each of said clocks at n intermediate times $t+(T/n), t+(2T/n), \ldots, t+(nT/n)$, where n is a positive integer, b) storing the numbers of clock pulses thereby obtained in memory, c) calculating the relative frequency uncertainty at time t+T from said numbers of clock pulses stored in memory, and d) iterating steps a) and b) at times t', where the difference between two consecutive times t' is less than T, and with said time window of duration T sliding to obtain said uncertainty at any time t'.

2. The method claimed in claim 1 wherein the difference between two consecutive times t' is of the order of T/n.

3. The method claimed in claim 1 wherein the duration of measuring said numbers of pulses at said intermediate times is of the order of T/n.

4. The method claimed in claim 1 wherein the duration T of said time window induces a relative frequency uncertainty error and said step c) further includes the following steps:

estimating the evolution of said uncertainty over said time window T from said numbers of clock pulses measured at said intermediate times and stored in memory, calculating said uncertainty error from said evolution, and correcting said uncertainty as a function of said error.

5. The method claimed in claim 1 wherein T is of the order of 1 second.

6. The method claimed in claim 1 wherein said measurements of the numbers of clock pulses obtained are completed by interpolation.

7. A mobile radio system having a first part able to communicate via a first mobile radio network at a first particular frequency and a second part able to communicate via a second mobile radio network at a second particular frequency, in which system each part has a clock from which said particular frequency is derived and which system further includes a system for measuring the number of pulses of each of said clocks and a program memory containing a program which, when executed, will perform a method of estimating the relative frequency uncertainty between said first part and said second part, in which method each part of said mobile radio system has a clock from which said particular frequency is derived and said uncertainty is estimated by measuring the number of pulses of each of said clocks during a time window of duration T starting at a time t, and which method includes the following steps:

a) measuring the number of pulses of each of said clocks at n intermediate times t+(T/n), t+(2T/n), ..., t+(nT/n), where n is a positive integer, b) storing the numbers of clock pulses thereby obtained in memory, c) calculating the relative frequency uncertainty at time t+T from said numbers of clock pulses stored in memory, and d) iterating steps a) and b) at times t', where the difference between two consecutive times t' is less than T, and with said time window of duration T sliding to obtain said uncertainty at any time t'.

8. A mobile radio system having a first part able to communicate via a first mobile radio network at a first particular frequency and a second part able to communicate via a second mobile radio network at a second particular frequency, in which system each part has a clock from which said particular frequency is derived and which system further includes a system for measuring the number of pulses of each of said clocks during a time window of duration T starting at a time t, a calculator unit, and a memory for storing the numbers of clock pulses measured at intermediate times t+(T/n), t+(2T/n), ..., t+(nT/n).

9. The system claimed in claim 8 wherein said memory is a FIFO memory.

10. The system claimed in claim 8 further including a unit for estimating the error resulting from the duration T of said time window.

* * * * *